(12) United States Patent
Kuromizu

(10) Patent No.: US 8,579,454 B2
(45) Date of Patent: Nov. 12, 2013

(54) LIGHTING DEVICE, DISPLAY DEVICE AND TELEVISION DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/704,694

(22) PCT Filed: May 25, 2011

(86) PCT No.: PCT/JP2011/061935
§ 371 (c)(1),
(2), (4) Date: Dec. 17, 2012

(87) PCT Pub. No.: WO2012/002074
PCT Pub. Date: Jan. 5, 2012

(65) Prior Publication Data
US 2013/0120669 A1    May 16, 2013

(30) Foreign Application Priority Data
Jun. 30, 2010  (JP) .................................. 2010-149363

(51) Int. Cl.
*G09F 13/04*  (2006.01)
(52) U.S. Cl.
USPC ................ 362/97.2; 362/97.1; 362/97.4
(58) Field of Classification Search
USPC ................ 362/97.1–97.4, 632–634
See application file for complete search history.

(56) References Cited

U.S. PATENT DOCUMENTS

| 4,096,550 | A | * | 6/1978 | Boller et al. | 362/627 |
| 7,367,706 | B2 | * | 5/2008 | Ura | 362/632 |
| 2007/0230217 | A1 | * | 10/2007 | Sakaki | 362/624 |

(Continued)

FOREIGN PATENT DOCUMENTS

| JP | 2004-184493 A | 7/2004 |
| JP | 2004-296193 A | 10/2004 |

(Continued)

OTHER PUBLICATIONS

Official Communication issued in International Patent Application No. PCT/JP2011/061935, mailed on Aug. 30, 2011.

*Primary Examiner* — Evan Dzierzynski
(74) *Attorney, Agent, or Firm* — Keating & Bennett, LLP

(57) ABSTRACT

An edge light-type lighting device with which uneven brightness on a display surface hardly occurs or is less likely to occur even though a positioning structure for positioning a light guide plate is included is provided. A backlight unit 24 according to the present invention includes a light guide plate 20, an LED unit 32, a reflection sheet 26, a backlight chassis 22, and a positioning pin 40. The light guide plate 20 has a light entrance surface 20a on the side, a light exit surface 20b on the front, an opposite surface 20c on the back, and a cutout 38 at edges. The LED unit 32 is arranged opposite the light entrance surface 20a of the light guide plate 20. The reflection sheet 26 is arranged on the opposite surface 20c side. The backlight chassis 22 includes a bottom plate 22a and side plates 22b, 22c. The positioning pin 40 is provided on the backlight chassis 22 and for positioning the light guide plate 20 when fitted in the cutout 38. The positioning pin 40 is fitted in the cutout 38. The reflection sheet 26 includes a portion that is bent in a location where the cutout 38 is located and covers a part of the positioning pin 40 exposed on an opposite side to the side plate 22b or 22c.

19 Claims, 16 Drawing Sheets

(56) References Cited

U.S. PATENT DOCUMENTS

| | | |
|---|---|---|
| 2008/0303979 A1 | 12/2008 | Shimizu |
| 2009/0316063 A1 | 12/2009 | Watanabe |
| 2013/0120669 A1* | 5/2013 | Kuromizu .................... 348/790 |

FOREIGN PATENT DOCUMENTS

| | | |
|---|---|---|
| JP | 2008-305576 A | 12/2008 |
| JP | 2010-002745 A | 1/2010 |
| JP | 2010-008682 A | 1/2010 |

* cited by examiner

LIGHTING DEVICE, DISPLAY DEVICE AND TELEVISION DEVICE

TECHNICAL FIELD

The present invention relates to a lighting device, a display device, and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be reduced. Liquid crystal panels included in the liquid crystal display devices do not emit light, and thus backlight devices are required as separate lighting devices.

An edge light-type backlight device including a light guide plate with a light entrance surface on the side and light sources such as LEDs arranged opposite the side of the light guide plate is known. Such a backlight device may includes a positioning structure for positioning the light guide plate relative to a chassis that holds the light guide plate therein.

Patent Document 1 discloses an edge light-type backlight device including a positioning structure for positioning a light guide plate. The backlight device includes the light guide plate, LED light sources, and a chassis. The light guide plate has a light entrance surface on aside. The LED light sources arranged opposite the side of the light guide plate. The chassis holds the light guide plate therein. The light guide plate has cutouts in sides thereof. Each cutout has a square U shape in plan view. Projections are provided on side plates of the chassis opposite the cutouts. In the backlight device, the projections on the chassis are fitted in the cutouts of the light guide plate. As a result, the light guide plate is positioned relative to the planar direction thereof.

RELATED ART DOCUMENT

Patent Document
    Patent Document 1: Japanese Unexamined Patent Application Publication No. 2010-2745

Problem to be Solved by the Invention

In the backlight device disclosed in Patent Document 1, rays of light reaching the projection after traveling through the light guide plate may be blocked by the projection. As a result, a dark spot may appear. If an entire surface of the light guide plate corresponds to a display area, the dark spot may cause uneven brightness on the surface of the backlight device on a display side.

DISCLOSURE OF THE PRESENT INVENTION

The present invention was made in view of the foregoing circumstances. An object of the present invention is to provide an edge light-type lighting device in which uneven brightness hardly occurs or is less likely to occur although a positioning structure for positioning a light guide plate is provided.

Means for Solving the Problem

Technologies described herein are related to a lighting device having the following configurations. The lighting device includes a light guide plate, a light source, a reflection sheet, a housing, and a positioning member. The light guide plate has a light entrance surface, a light exit surface, an opposite surface, and a cutout. The light entrance surface is a side surface of the light guide plate. The light exit surface is one of plate surfaces of the light guide plate. The opposite surface is an opposite surface from the light exit surface. The light source is arranged opposite the light entrance surface of the light guide plate. The reflection sheet is arranged on the opposite surface of the light guide plate. The housing has a bottom plate and a side plate that rises from an edge of the bottom plate in the direction in which one of the surfaces of the light guide plate faces. The housing holds at least the reflection sheet and light guide plate arranged on the one of the surfaces of the bottom plate. The positioning member is provided on the housing and fitted in the cutout such that the light guide plate is positioned with respect to a planar direction thereof. The positioning member is fitted in the cutout. The reflection sheet has a bent portion in a location where the cutout is located, and covers at least a part of the positioning member exposed on an opposite side to the side plate.

According to the above lighting device, rays of light reaching the positioning member among rays of light traveling through the light guide plate reach the positioning member from an opposite side to the side plate of the housing. Furthermore, at least a part of the positioning member exposed on the opposite side to the side plate is covered by the bent portion of the reflection sheet. At least some of the rays reaching the positioning member are reflected by the reflection sheet. Even if the entire area of the light exit surface of the light guide plate corresponds to the display area, a dark spot that may be caused by the positioning member hardly appear or are less likely to appear. Therefore, uneven brightness in light emitted by the lighting device hardly occurs of is less likely to occur.

The reflection sheet may include a first bent portion provided by bending a part of the reflection sheet toward the light exit surface of the light guide plate in the location where the cutout is located.

With this configuration, at least a part of a side surface of the positioning member is covered by the first bent portion.

The first bent portion may be provided by bending the portion of the reflection sheet along an edge of the cutout.

With this configuration, even if the light guide plate has a plurality of cutouts and the reflection sheet has a plurality of first bent portions, the bending points at which the first bent portions are bent have the same relation to the respective cutouts among the cutouts.

The first bent portion may include a plurality of first bent portions in the location where the cutout is located.

With this configuration, the side surface of the positioning member can be effectively covered by the plurality of first bent portions.

The reflection sheet may include a second bent portion provided by bending a portion of the reflection sheet at a distal end of the first bent portion toward the side plate of the housing.

With this configuration, at least a part of an upper portion of the positioning member can be covered by the second bent portion.

The reflection sheet may further include a third bent portion provided by bending a portion of the reflection sheet at a distal end of the second bent portion toward the bottom plate of the housing.

With the third bent portion, a larger area of the positioning member can be covered and thus the rays reaching the positioning member can be effectively reflected by the reflection sheet.

The positioning member may project from the bottom plate of the housing.

With this configuration, the light source can be arranged opposite a side edge of the light guide plate at which the cutout is provided.

The positioning member has a columnar shape.

With this configuration, the positioning member can be easily fitted in the cutout.

The reflection sheet may cover a top surface of the positioning member.

With this configuration, the top surface of the positioning member is covered by the reflection sheet. Therefore, the rays reaching the positioning member can be effectively reflected by the reflection sheet.

The reflection sheet may cover a side surface of the positioning member.

With this configuration, the side surface of the positioning member is covered by the reflection sheet. Therefore, the rays reaching the positioning member can be effectively reflected by the reflection sheet.

The lighting device may further include an optical member. A portion of the reflection sheet covering the top surface of the positioning member may be sandwiched between the top surface and the optical member. Furthermore, the lighting device may further include a frame arranged adjacent to the light exit surface of the light guide plate. A portion of the reflection sheet covering the top surface of the positioning member may be sandwiched between the top surface and the optical member.

With this configuration, the portion of the reflection sheet covering the top surface of the positioning member is sandwiched, that is, the portion is fixed. Therefore, a displacement of the reflection sheet hardly occurs or is less likely to occur.

The cutout may be in a shape that tapers as a distance from the side plate of the housing increases.

With this configuration, if the cutout is provided in an side edge portion of the light guide plate opposite the light source, the rays of light emitted by the light source and enters the light guide plate through the light entrance surface are less likely to enter into the cutout.

The positioning member may be provided integrally with the bottom plate of the housing.

With this configuration, a simple manufacturing process and easy mounting of the positioning member can be provided.

The positioning member may include a plurality of positioning members arranged symmetrically about a center of the light guide plate. Alternatively, the positioning member may include a plurality of positioning members arranged asymmetrically about a center of the light guide plate.

With this configuration, the positioning members can be arranged according to the shape and/or the arrangement of the light guide plate.

The technologies described in this specification may be applied to a display device including a display panel configured to provide display using light from the above-described lighting device. A display device that includes a liquid crystal panel as such a display panel may be considered as new and advantageous. Furthermore, a television device including the above-described display device may be considered as new and advantageous. In the above-described display device or the above-described television device, a display area can be increased.

Advantageous Effect of the Invention

According to the technologies described in this specification, an edge light-type lighting device in which uneven brightness hardly occurs or is less likely to occur although a positioning structure for positioning a light guide plate is provided.

MODE FOR CARRYING OUT THE INVENTION

First Embodiment

A first embodiment will be explained with reference to drawings. X-axes, Y-axes and Z-axes are indicated in some drawings. The axes in each drawing correspond to the respective axes in other drawings. The X-axes and Y-axes are aligned with the horizontal direction and the vertical direction, respectively. In the following description, the top-bottom direction corresponds to the vertical direction unless otherwise specified.

Figure 1:
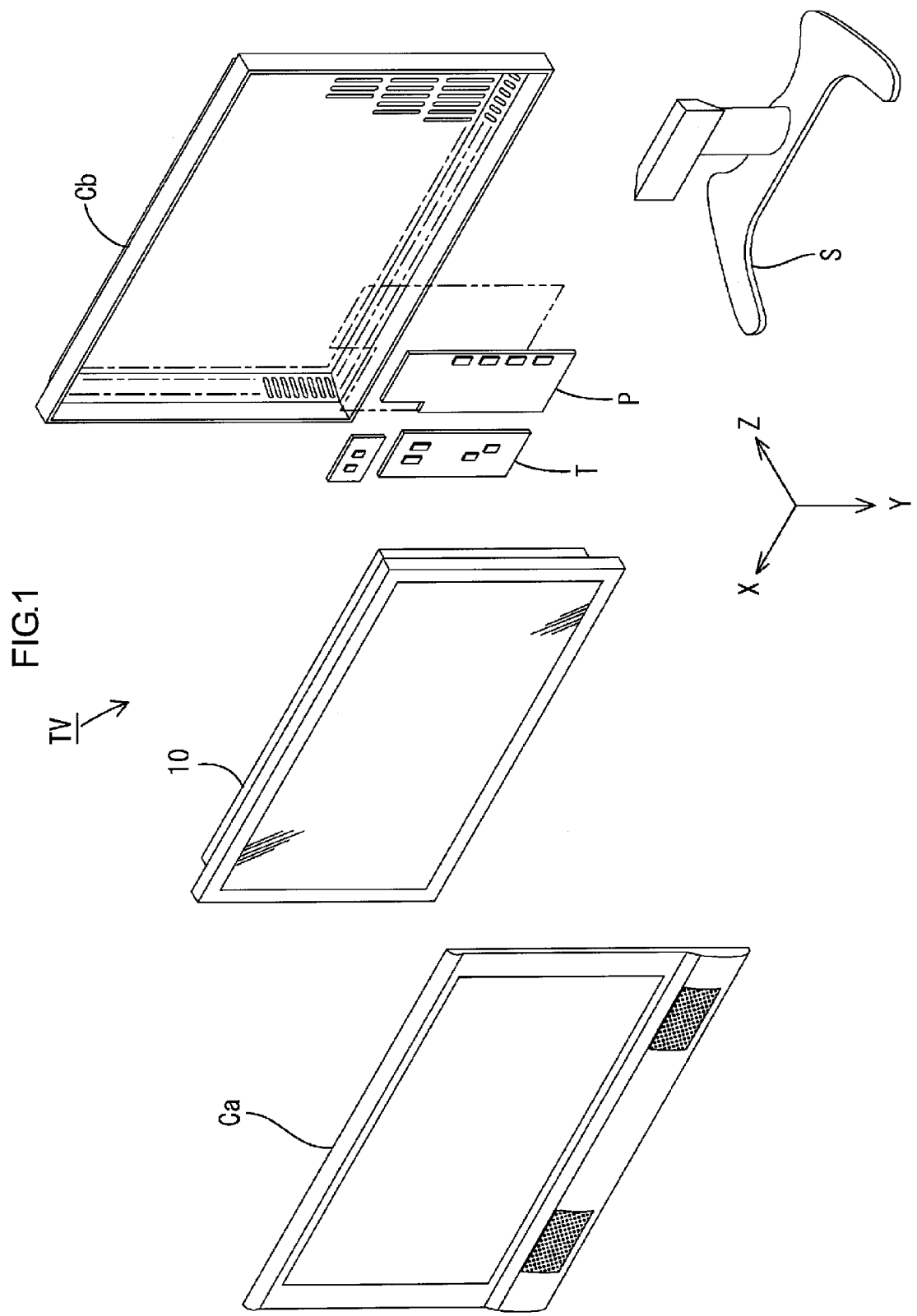
FIG. 1 is an exploded perspective view of a television device TV according to a first embodiment.

FIG. 1 is an exploded perspective view of a television device TV according to the first embodiment. The television device TV includes the liquid crystal display device 10, front and rear cabinets Ca, Cb that hold the liquid crystal display device 10 therebetween, a power source P, a tuner T, and a stand S.

Figure 2:
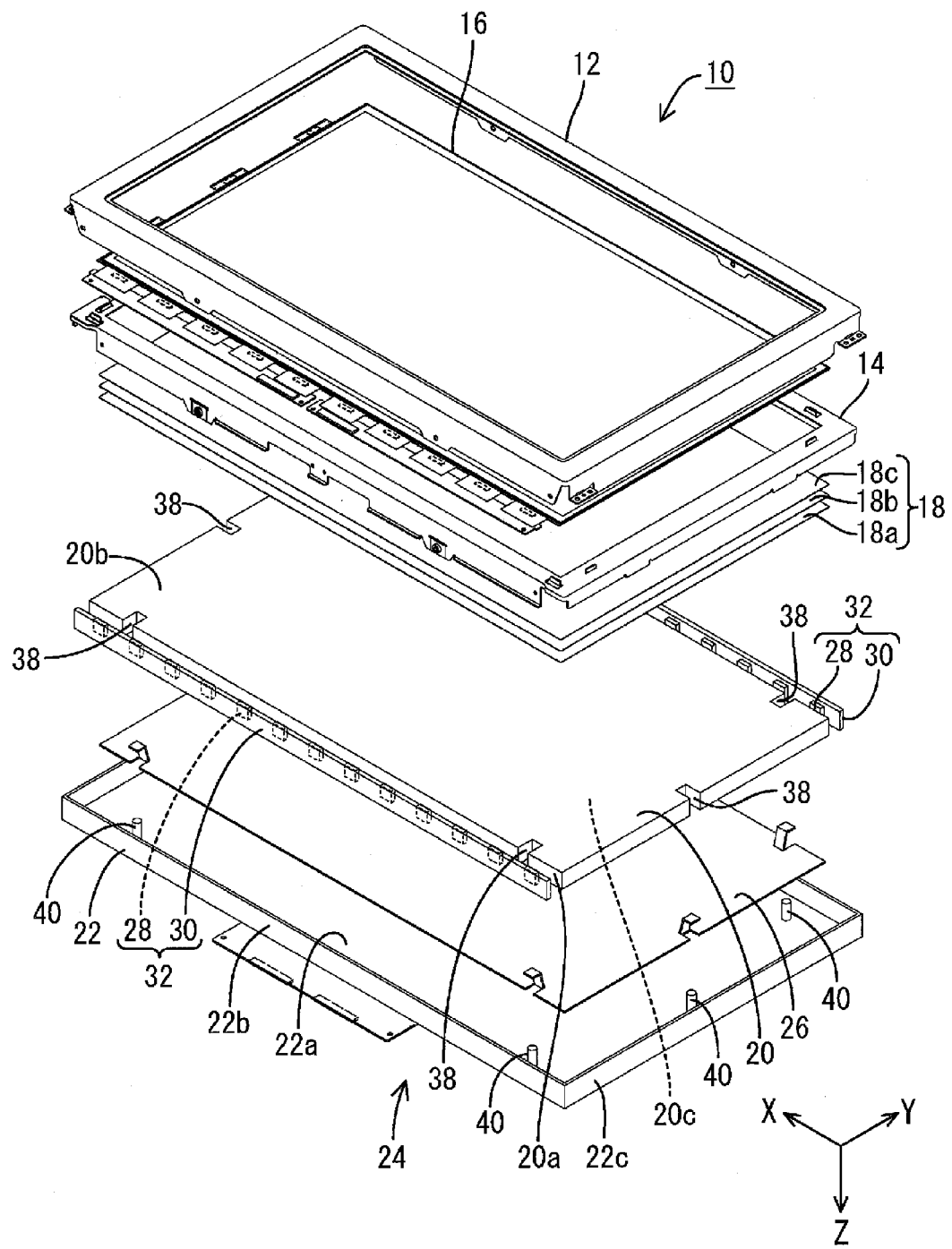
FIG. 2 is an exploded perspective view of a liquid crystal display device 10.

FIG. 2 is an exploded perspective view of the liquid crystal display device 10. In FIG. 2, the upper side and the lower side correspond to the front side and the rear side of the liquid crystal display device 10, respectively. As illustrated in FIG. 2, an overall shape of the liquid crystal display device 10 is a landscape rectangular. The liquid crystal display device 10 includes a liquid crystal panel 16 and a backlight unit 24. The liquid crystal panel 16 is a display panel and the backlight unit 24 is an external light source. The liquid crystal panel 16 and the backlight unit 24 are integrally held with a bezel 12 having a frame-like shape.

Next, the liquid crystal panel 16 will be explained. The liquid crystal panel 16 includes a pair of transparent glass substrates (having a high light transmission capability) and a liquid crystal layer (not illustrated). The glass substrates are bonded together with a predetermined gap therebetween. The liquid crystal layer is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes and an alignment film are provided. Image data and various control signals are transmitted from a driver circuit board (not illustrated) to the source lines, the gate lines, and the counter electrodes for displaying images. Polarizing plates (not illustrated) are attached to outer surfaces of the glass substrates.

Next, the backlight unit 24 will be explained. As illustrated in FIG. 2, the backlight unit 24 includes a frame 14, an optical member 18, and a backlight chassis 22. The frame 14 supports the liquid crystal panel 16 at the inner edges thereof. The optical member 18 is placed on the front surface of a light guide plate 20 (on a light exit surface 20b). The backlight chassis 22 has a substantially box-like shape with an opening on the front side (the light exit side closer to the liquid crystal panel 16).

A pair of LED (light emitting diodes) units 32, a cushion sheet 27, a reflection sheet 26, and the light guide plate 20 are held in the backlight chassis 22. The LED units 32 are arranged along the long edges, or on side plates 22b and 22c, of the backlight chassis 22, respectively. The LED units 32 emit light. The light guide plate 20 is arranged such that long side surfaces (light entrance surfaces) 20a are opposite the respective LED units 32. The light emitted by each LED unit 32 is guided to the liquid crystal panel 16. The optical member 18 is placed on the front surface of the light guide plate 20. In the backlight unit 24 of this embodiment, the light guide plate 20 and the optical member 18 are arranged immediately below the liquid crystal panel 16. Furthermore, the LED units 32, which are light sources, are arranged at the side edges of the light guide plate 20. Namely, the backlight unit 24 uses an edge lighting method (a side lighting method).

The backlight chassis 22 is made of metal, for instance, aluminum-based material. The backlight chassis 22 includes a bottom plate 22a, long edge portions 22b, 22c and short edge portions. The long edge portions 22b and 22c rise from the respective long edges of the bottom plate 22a. The short edge portions rise from the respective short edges of the bottom plate 22a.

The reflection sheet 26 is made of synthetic resin with a white surface having a high light reflectivity. The reflection sheet 26 is placed on the front surface of bottom plate 22a of the backlight chassis. The front surface of the reflection sheet 26 is a light reflection surface that faces an opposite surface 20c of the light guide plate 20. Leaking light from the LED units 32 is reflected by the light reflection surface and guided toward the opposite surface 20c of the reflection sheet 26 such that the light enters the opposite surface 20c. A power supply circuit board for supplying power to the LED units 32 is mounted to the rear surface of the bottom plate 22a (not illustrated).

The light guide plate 20 is a rectangular plate made of resin having a high light transmission capability (high transparency), such as acrylic. The light guide plate 20 is held by the backlight chassis 22. As illustrated in FIG. 2, the light guide plate 20 is arranged between the LED unit 26 and the side plate 22c of the backlight chassis 22 such that the light exit surface 20b, which is a main surface, faces the diffuser sheet 18a. A surface opposite from the light exit surface 20b is the opposite surface 20c. Because the light guide plate 20 is arranged as described above, the light emitted by the LED unit 32 enters the light guide plate 20 through the light entrance surface 20a and exits therefrom through the light exit surface 20b that faces the diffuser sheet 18a. As a result, the liquid crystal panel 16 is illuminated from the back.

A plurality of positioning pins 40 arranged along edges of the bottom plate of the backlight chassis 22 project frontward. The light guide plate 20 has cutouts 39 at edges in locations where the positioning pins 40 are located. Portions of the light guide plate 20 are bent frontward in the locations where the positioning pins 40 are located. The positioning pins 40 are passed through the cutouts 38 from the rear and covered in part with the bent portions of the light guide plate 20. The positioning pins 40 are fitted in the cutouts. With this configuration, the light guide plate 20 is positioned relative to the surface direction. Configurations of the positioning pins 40, the cutouts 38 of the light guide plate 20, portions of the reflection sheet 26 where the positioning pins 40 are positioned will be explained later in detail.

The optical member 18 includes a diffuser sheet 18a, a lens sheet 18b, and a reflection-type polarizing plate 18c layered in this sequence from the light guide plate 20 side. The diffuser sheet 18a, the lens sheet 18b, and the reflection-type polarizing plate 18c have a function to convert the light emitted by the LED units 32 and passed through the light guide plate 20 into planar light. The liquid crystal panel 16 is arranged on the upper surface of the reflection-type polarizing plate 18d.

The optical member 18 is arranged between the light guide plate 20 and the liquid crystal panel 16.

Each LED unit 32 includes an LED board 30 and LEDs 28. The LED board 20 is rectangular and made of resin. The LEDs 28 configured to emit white light are arranged in line on the LED board 30. The LED boards 30 are fixed to the side plate 22b and 22c of the backlight chassis 22 with screws, respectively. Each LED 28 can be configured as one of the followings. The LED 28 may include a blue light emitting element with a phosphor having a light emission peak in a yellow region applied on the blue light emitting element to emit white light. The LED 28 may include a blue light emitting element with a phosphor having a light emission peak in a green region and a phosphor having a light emission peak in a red region applied on the blue light emitting element to emit white light. The LED 28 may include a blue light emitting element with a phosphor having a light emission peak in a green region applied on the blue light emitting element, and a red light emitting element to emit white light. The LED 28 may include an ultraviolet light emitting element and a phosphor. The LED 28 may include an ultraviolet light emitting element with phosphors having light emissions peaks in the blue region, the green region, and the red region, respectively, applied on the ultraviolet light emitting element.

Figure 3:
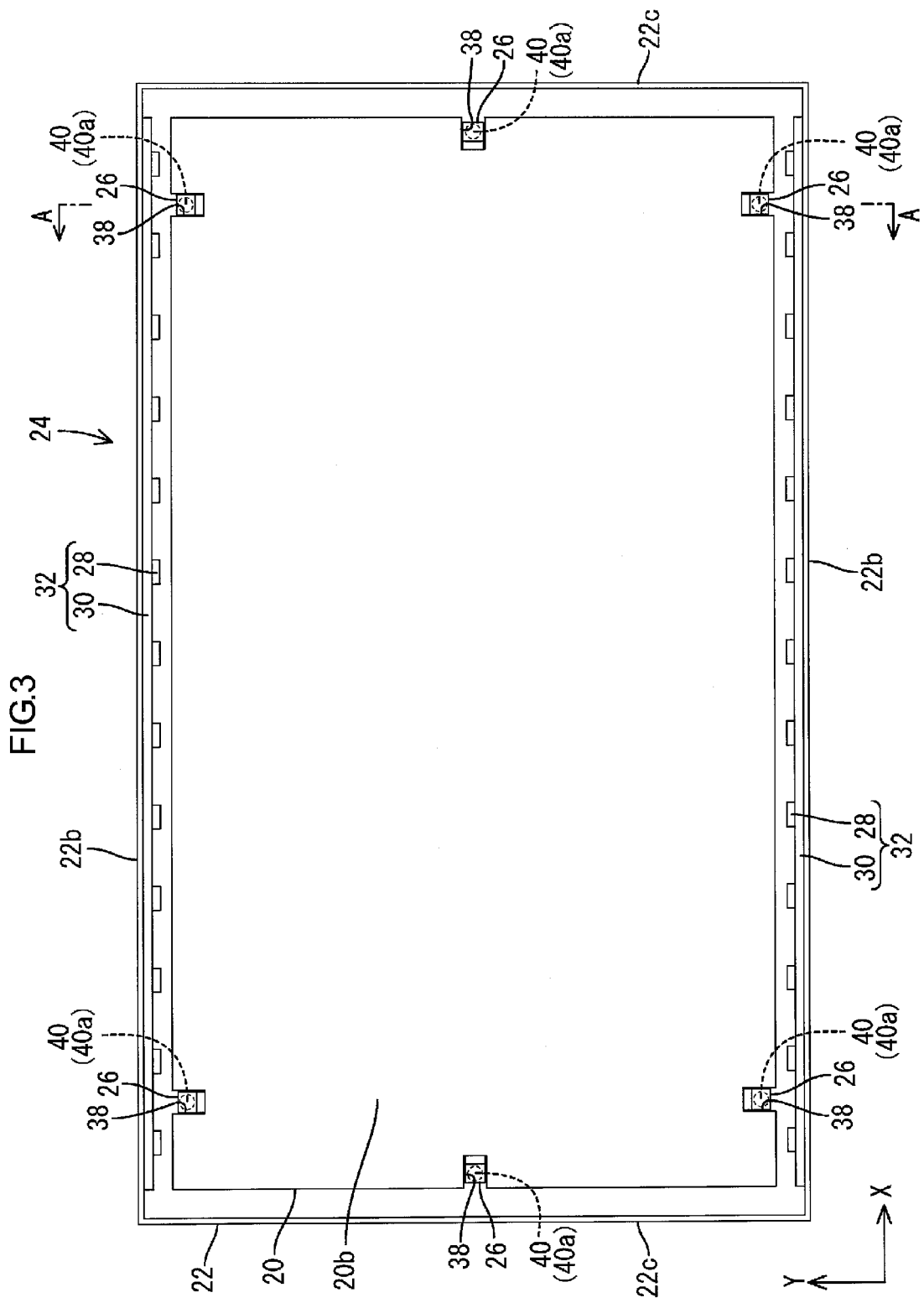
FIG. 3 is a plan view of a backlight unit 24 viewed from the front.
Figure 4:
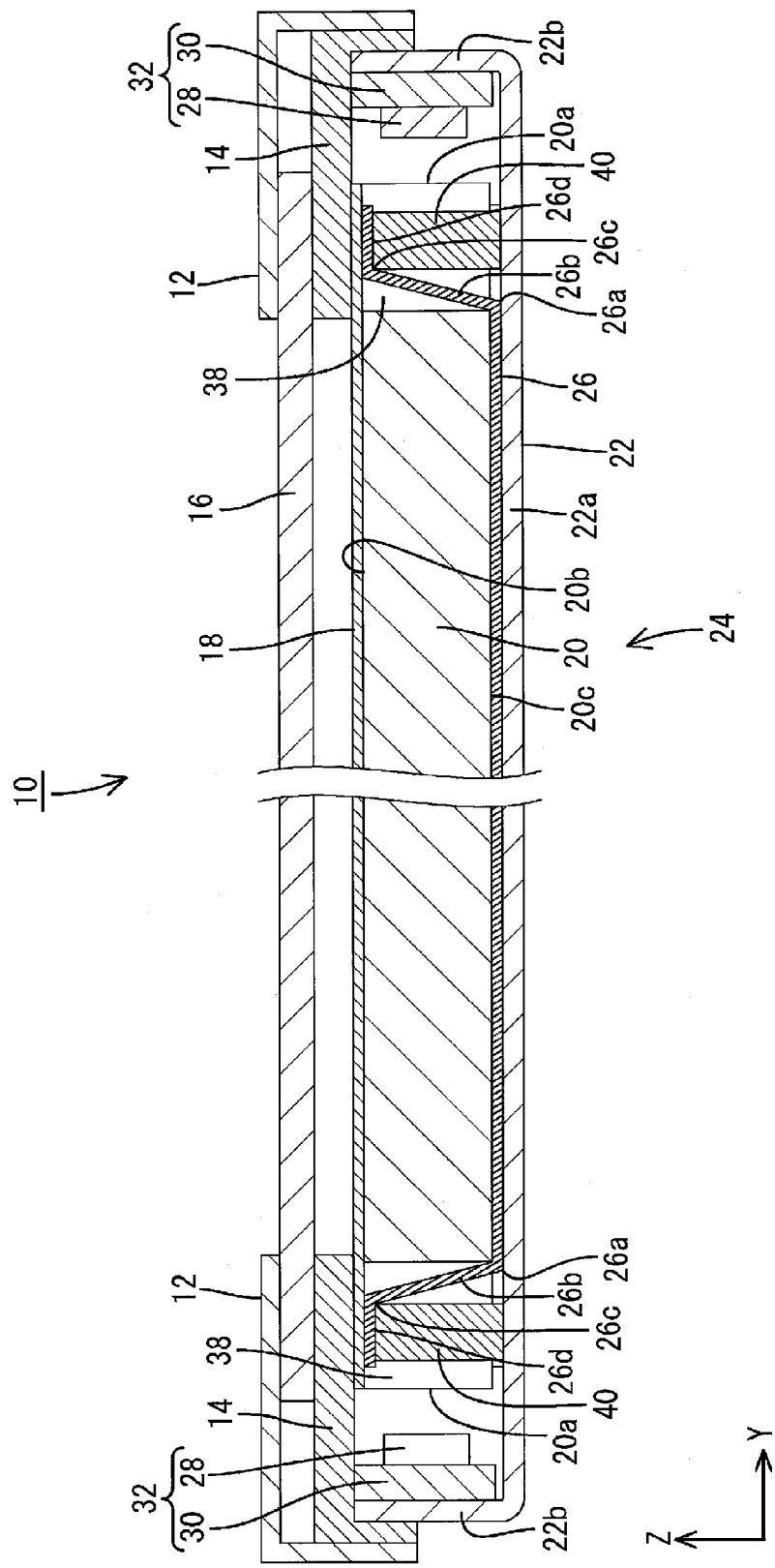
FIG. 4 is a cross-sectional view of the liquid crystal display device 10 along line A-A in FIG. 3.
Figure 5:
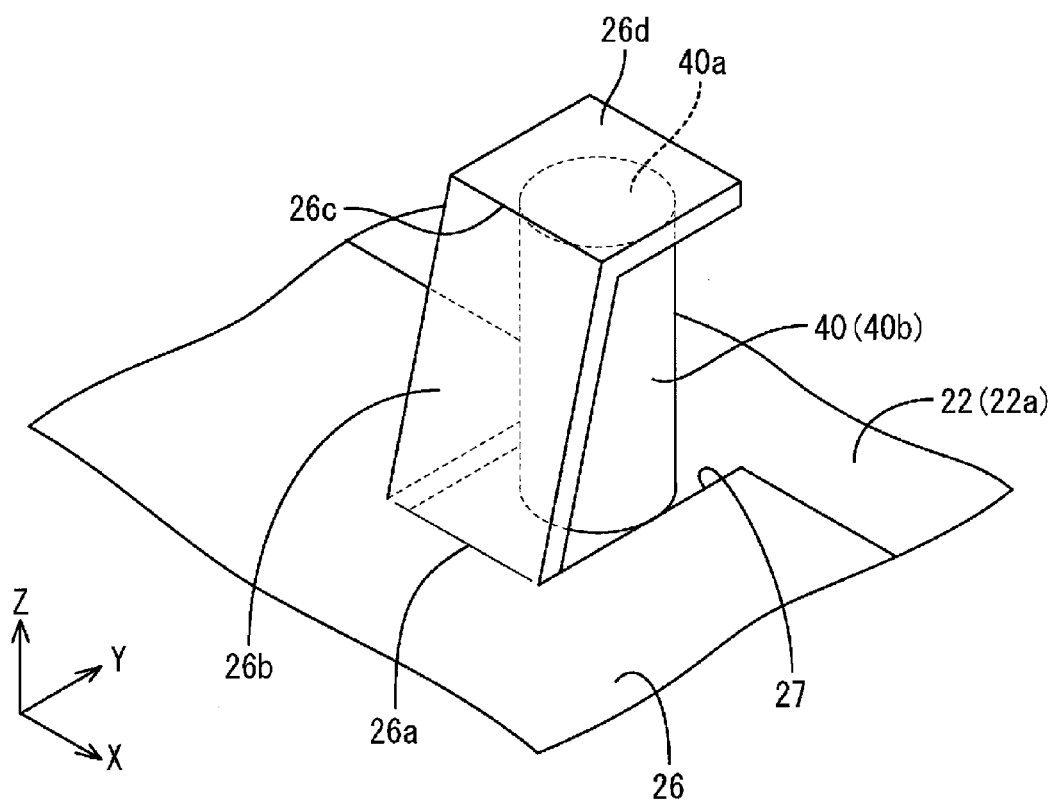
FIG. 5 is a magnified perspective view illustrating a positioning pin 40 and a part of a reflection sheet 26 viewed at an angle from above.

Next, the configurations of the positioning pins 40, the cutouts 38 of the light guide plate 20, portions of the reflection sheet 26 where the positioning pins 40 are located will be explained. FIG. 3 is a plan view of a backlight unit 24 viewed from the front. FIG. 4 is a cross-sectional view of the liquid crystal display device 10 along line A-A in FIG. 3, that is, a vertical cross section of the liquid crystal device 10. FIG. 5 is a magnified perspective view illustrating a positioning pin 40 and a part of a reflection sheet 26 viewed at an angle from above.

As illustrated in FIG. 3, six positioning pins 40 project from the bottom plate 22a of the backlight chassis 22. Two of the six positioning pins 40 are arranged at each long side edge of the bottom plate 22a of the backlight chassis 22. One of the six positioning pins 40 is arranged at each short side edge of the bottom plate 22a of the backlight chassis 22. Each positioning pin 40 has a columnar shape and the bottom surface thereof is attached to the bottom plate 22a of the backlight chassis 22 and fixed thereto with adhesive or the like. The positioning pins 40 arranged at the long side edges of the bottom plate 22a of the backlight chassis 22 are located between the adjacent LEDs 28 of the corresponding LED units 32.

The cutouts 38 of the light guide plate 20 are provided in location where the positioning pins 40 are arranged when the light guide plate 20 is housed in the backlight chassis 22. Therefore, the cutouts 38 are provided at the edges of the light guide plate 20 in the same number as that of the positioning pins 40. As illustrated in FIG. 3, each cutout 38 has a square U-like shape in plan view and a width larger than a diameter of the positioning pin 40 having the columnar shape. Therefore, the positioning pin 40 can be passed through the cutout 38 from the rear and fitted therein.

The reflection sheet 26 is placed in about entire area of the bottom plate 22a of the backlight chassis 22. As illustrated in FIG. 5, the reflection sheet 26 has reflection sheet cutouts in locations where the positioning pins 40 are arranged when the reflection sheet 26 is placed on the bottom plate 22a of the backlight chassis 22. Each reflection sheet cutout 27 has a square U-like shape in plan view. When the reflection sheet 26 is placed on the bottom plate 22a of the backlight chassis 22, the corresponding positioning pin 40 passes through the reflection sheet cutout 27 and exposed on the front side of the reflection sheet 26.

A portion of the reflection sheet 26 having a reed shape projects from an edge of the reflection sheet cutout 27 having the square U shape inner than the positioning pin 40 (closer to the middle of the reflection sheet 26). A part of the reed shaped portion is bent on the front side of the backlight unit 24 (the light exit side of the light guide plate 20) such that the part covers a part of the positioning pin 40. Specifically, the part of the reflection sheet 26 in the reed shape is bent frontward at the first bending point 26a (i.e., along one of the edges of the reflection sheet cutout 27). When the light guide plate 20 is arranged on the front side of the reflection sheet 26, the portion of the reflection sheet 26 in the reed shape projects from the cutout 38 of the light guide plate 20 such that the portion is exposed on the front side of the light guide plate 20 (see FIG. 3).

The portion of the reflection sheet 26 in the reed shape includes a first bent section 26b provided by bending the part frontward at the first bending point 26a. As illustrated in FIG. 4, the first bent section 26b is tilted toward the positioning pin 40 in cross-sectional view. A portion of the distal end of the first bent section 26b is in contact with a part of a round edge of the top surface 40a of the positioning pin 40. A portion of the side surface 40b of the positioning pin 40 exposed on an opposite side to the backlight chassis 22b, 22c is covered by the first bent section 26b. The first bent section 26b is further bent toward side plate 22b or 22c of the backlight chassis 22 at the part of the distal end in contact with the positioning pin 40.

A second bent section 26d is provided by bending a part connected to the distal end of the first bent section 26b at the second bending point 26c. The second bending portion 26d is parallel to the top surface 40a of the positioning pin 40 and in contact with the entire area of the top surface 40a of the positioning pin 40. The entire area of the top surface 40a of the positioning pin 40 is covered by the second bent section 26d. As illustrated in FIG. 4, the front surface of the second bent section 26d is located at a substantially equal vertical position as the light exit surface 20b of the light guide plate 20. The optical member 18 is placed on light exit surface 20b of the light guide plate 20 and the front surface of the second bend portion 26d. Therefore, the second bent section 26d is sandwiched between the top surface 40a of the positioning pin 40 and the optical member 18. With this configuration, the portion of the reflection sheet 26 in the reed shape projecting from the first bending point 26a is fixed.

In the backlight unit 24, when the LEDs 28 are turned on, rays of light emitted by the LEDs 28 enter the light guide plate 20 through the light entrance surface 20a. The rays that reach the positioning pins among the rays enter the light guide plate 20 reach the positioning pins 40 from sides opposite to the side plate 22b or 22c of the backlight chassis 22. When the rays have reached the positioning pins 40, the rays are reflected by the first bent section 26b of the reflection sheet 26 covering the portions of the side surfaces 40b of the positioning pins 40. Then, the rays reenter the light guide plate 20. With this configuration, dark spots that may be caused by the positioning pins 40 hardly appear or are less likely to appear even if the rays are blocked by the positioning pins 40.

As described above, in the backlight unit 24 according to this embodiment, the rays that reach the positioning pins 40 among the rays travel in the light guide plate 20 reach the positioning pins 40 from the opposite side to the side plate 22b or 22c of the backlight chassis 22. At least a part of each positioning pin 40 exposed on the opposite side to the side plate 22b or 22c is covered by the reflection sheet 26. With this configuration, dark spots that may be caused by the positioning pins 40 hardly appear or are less likely to appear. Therefore, uneven brightness in rays of light emitted by the backlight unit 24 hardly occurs or is less likely to occur.

In the backlight unit 24 according to this embodiment, the reflection sheet 26 includes the first bent sections that are bent toward the light exit surface 20b of the light guide plate 20 in the locations where the cutouts 38 are located. Therefore, the portions of the side surfaces 40b of the positioning pins 40 can be covered by the first bent sections 26b.

In the backlight unit 24 according to this embodiment, each first bent section 26b is provided by bending the reed shaped portion along the edge of the cutout 38. Therefore, the bending points at which the first bent sections 26b are bent have the same relation to the respective cutouts 38 among those six cutouts 38 provided in the light guide plate.

In the backlight unit 24 according to this embodiment, the reflection sheet 26 includes the second bent sections 26d. Each second bent section 26d is provided by further bending the reed shaped portion toward the side plate 22b or 22c of the backlight chassis 22 along the distal end of the first bent section 26b. Therefore, the top surfaces of the positioning pins 40 can be covered by the second bent sections 26d.

In the backlight unit 24 according to this embodiment, the positioning pins 40 project from the bottom plate 22a of the backlight chassis 22. Therefore, the LED units 32 can be arranged opposite the sides of the light guide plate 20 at which the cutouts are provided.

In the backlight unit 24 according to this embodiment, each positioning pin 40 has a columnar shape. Therefore, the positioning pins 40 can be easily fitted in the cutouts 38.

In the backlight unit 24 according to this embodiment, the reflection sheet 26 covers the top surfaces 38a of the positioning portion 38. By covering the top surfaces 40a of the positioning pins 40 with the reflection sheet 26, the rays that reach the positioning pins 40 are effectively reflected by the reflection sheet 26.

In the backlight unit 24 according to this embodiment, the optical member 18 is arranged on the light exit surface 20b side, and the portions of the reflection sheet 26, which cover the top surfaces 40a of the positioning pins 40, are sandwiched between the top surfaces 40a and the optical member 18. By sandwiching the parts of the reflection sheet 26, the portions are fixed and thus a displacement of the reflection sheet 26 hardly occurs or is less likely to occur.

In the backlight unit 24 according to this embodiment, dark spots that may be caused by the positioning pins 40 hardly appear or are less likely to appear. Therefore, even if the entire area of the light exit surface 20b of the light guide plate 20 corresponds to the display area, frame areas of the backlight unit 24 can be reduced.

In the backlight unit 24 according to this embodiment, the positioning pins 40 provided at the long side edges of the bottom plate 22a of the backlight chassis 22 are arranged between the adjacent LEDs of the respective LED units 32 that face thereto. In comparison to a configuration in which the cutouts 38 are provided opposite the LEDs 28, the rays from the LEDs 28 are less likely to enter into the cutouts 38 and thus the brightness of the backlight unit 24 can be improved.

Second Embodiment

Figure 6:
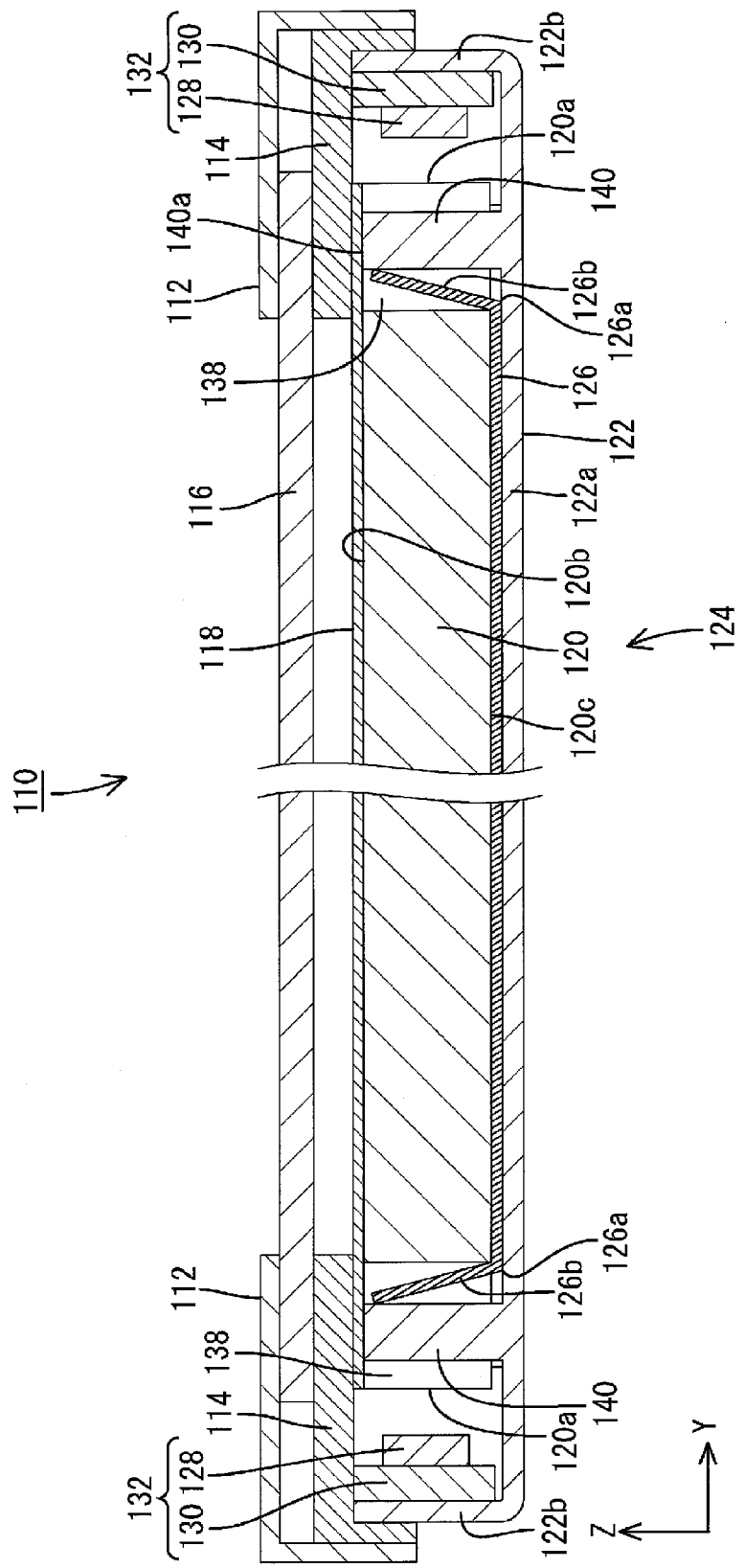
FIG. 6 is a cross-sectional view of a liquid crystal display device 110 according to a second embodiment.
Figure 7:
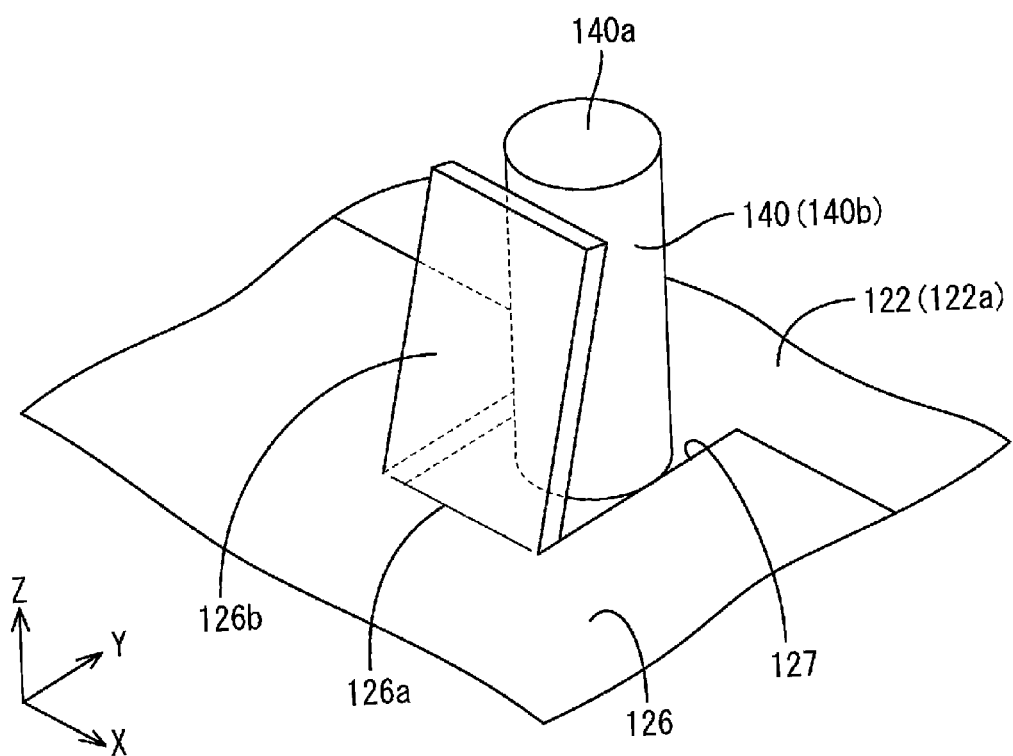
FIG. 7 is a magnified perspective view illustrating a positioning pin 140 and a part of a reflection sheet 126 viewed at an angle from above.

A second embodiment will be explained with reference to the drawings. FIG. 6 is a cross-sectional view of a liquid crystal display device 110 according to the second embodiment. FIG. 7 is a magnified perspective view illustrating a positioning pin 140 and a part of a reflection sheet 126 viewed at an angle from above. The reflection sheet 126 that covers parts of the positioning pins 140 has a different configuration from the reflection sheet 26 of the first embodiment. Other configurations are the same as those of the first embodiment. The same structures, operations, and effects as those of the first embodiment will not be explained. In FIGS. 6 and 7, components indicated by symbols with 100 added to those in FIGS. 4 and 5 have the same configurations as those indicated by the symbols without 100 in the first embodiment.

In a backlight unit 124 according to the second embodiment, the second bent sections are not provided at the distal ends of the first bent sections 126b of the reflection sheet 126. The distal ends of the first bent sections 126 are in contact with portions of side surfaces of the positioning pins 140. The top surfaces of the positioning pins 140 are not covered by the reflection sheet 126. Portions of the side surfaces 140b are covered by the reflection sheet 126. With this configuration, at least some of rays that reach the positioning pins 140 are reflected by the reflection sheet 126. Therefore, dark spots that may be caused by the positioning pins 140 hardly appear or are less likely to appear.

In a backlight unit 124 according to this embodiment, the positioning pins 140 are integrally provided with a bottom plate 122a of a backlight chassis 122 as illustrated in FIG. 6. Therefore, a simple manufacturing process and easy mounting of the positioning pins 40 can be provided.

Third Embodiment

Figure 8:
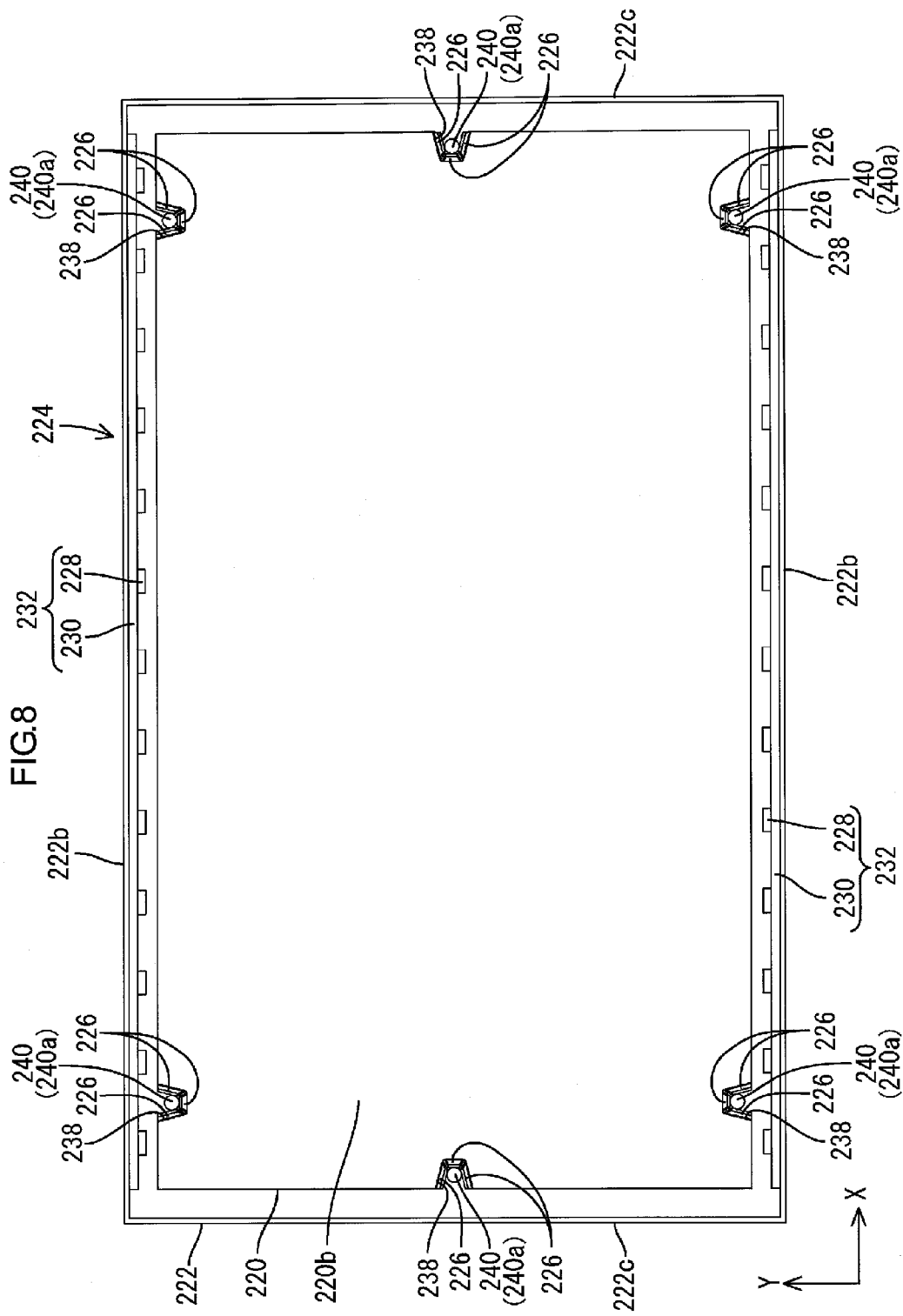
FIG. 8 is a plan view of a backlight unit 224 viewed from the front according to a third embodiment.
Figure 9:
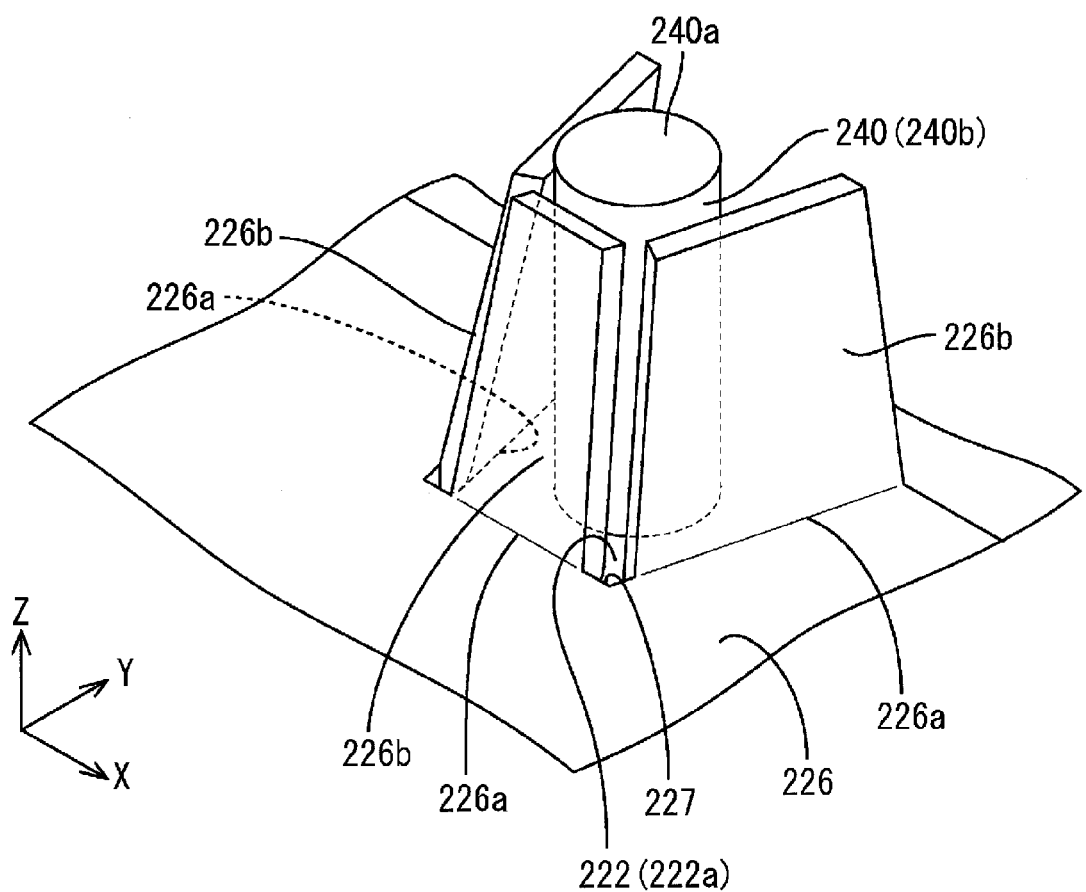
FIG. 9 is a magnified perspective view illustrating a positioning pin 240 and a part of a reflection sheet 226 viewed at an angle from above.

A third embodiment will be explained with reference to the drawings. FIG. 8 is a plan view of a backlight unit 224 viewed from the front according to a third embodiment. FIG. 9 is a magnified perspective view illustrating a positioning pin 240 and a part of a reflection sheet 226 viewed at an angle from above. Cutouts 238 are formed in a different shape from that of the cutouts 38 of the first embodiment. The reflection sheet 226 that covers parts of the positioning pins 240 has a different configuration from that of the first embodiment. Other configurations are the same as those of the first embodiment. The same structures, operations, and effects as those of the first embodiment will not be explained. In FIGS. 8 and 9, components indicated by symbols with 200 added to those in FIGS. 3 and 5 have the same configurations as those indicated by the symbols without 200 in the first embodiment.

In the backlight unit 224 according to the third embodiment, the shape of each cutout 238 is a tapered shape that tapers as a distance from a side plate 222b or 222c of the backlight chassis 222 increases as illustrated in FIG. 8. Specifically, the cutout 238 is substantially trapezoidal in plan view with a side close to the side plate 222b or 222c as a lower base side. The cutout 238 has a size that allows the columnar positioning pin 240 to pass through.

The reflection sheet 226 has reflection sheet cutouts 227 provided in locations where the positioning pins 240 are located when the reflection sheet 226 is placed on the bottom plate 222a of the backlight chassis 222. Each reflection sheet cutout 227 has a trapezoidal shape in plan view similar to the cutout 227 of the light guide plate 220. Portions of the reflection sheet 226 having a reed shape project from the respective edges of the cutout 227 having the trapezoidal shape. The reed shaped parts are bent frontward along the respective edges (at first bending points 226a) and provided as three first bent sections 226b. The distal ends of the three first bent sections 226b are in contact with parts of side surfaces 240b of the positioning pin 240, respectively. The side surfaces 240b of the positioning pin 240 are covered by the first bent sections 226b. Therefore, rays of light reaching the positioning pin 240 can be effectively reflected by the reflection sheet 226. With this configuration, dark spots that may be caused by the positioning pins 240 hardly appear or are less likely to appear.

Fourth Embodiment

Figure 10:
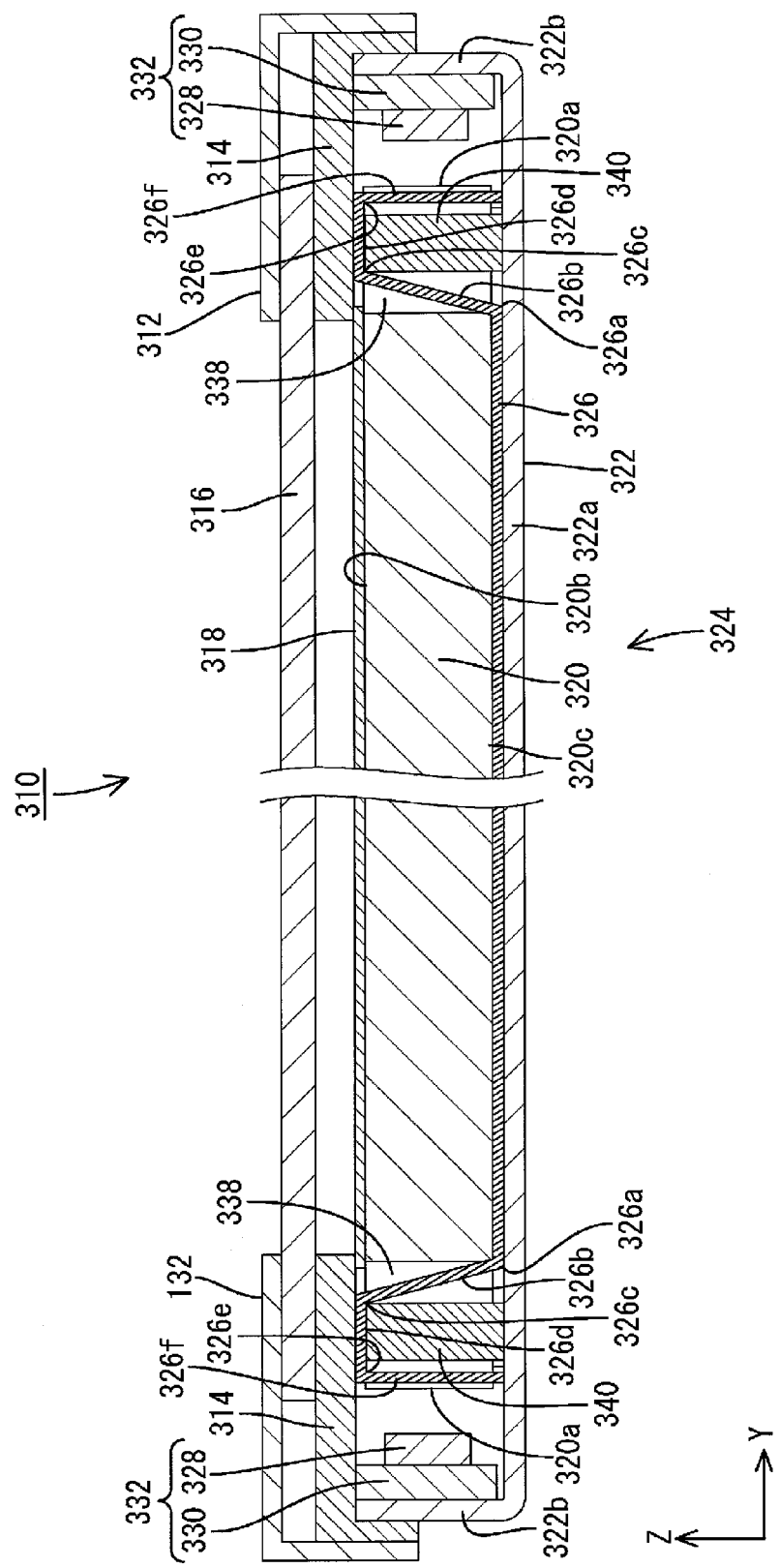
FIG. 10 is a cross-sectional view of a liquid crystal device 310 according to a fourth embodiment.
Figure 11:
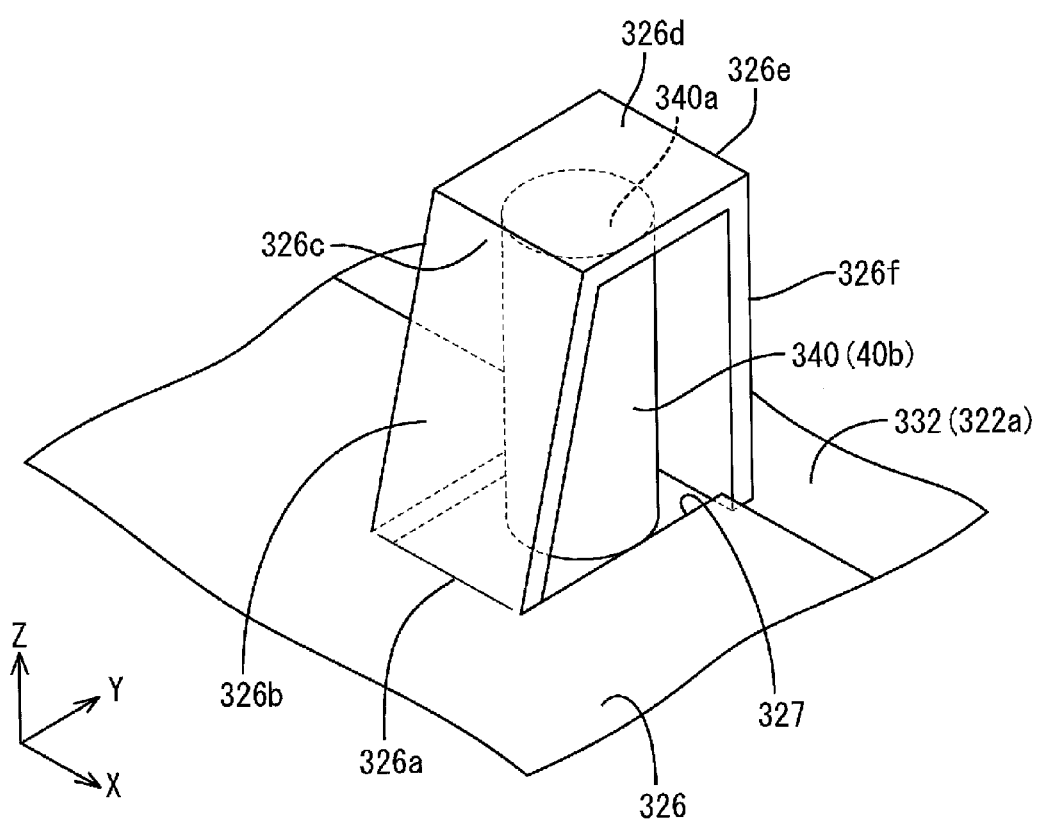
FIG. 11 is a magnified perspective view illustrating a positioning pin 340 and a part of a reflection sheet 326 viewed at an angle from above.

A fourth embodiment will be explained with reference to the drawings. FIG. 10 is a cross-sectional view of a liquid crystal device 310 according to a fourth embodiment. FIG. 11 is a magnified perspective view illustrating a positioning pin 340 and a portion of a reflection sheet 326 viewed at an angle from above. In the fourth embodiment, how the reflection sheet 326 that covers the top surface 340a of the positioning pin 340 is sandwiched and the shape of the reflection sheet 326 are different from the first embodiment. Other configurations are the same as those of the first embodiment. The same structures, operations, and effects as those of the first embodiment will not be explained. In FIGS. 10 and 11, components indicated by symbols with 300 added to those in FIGS. 4 and 5 have the same configurations as those indicated by the symbols without 300 in the first embodiment.

In a backlight unit 324 according to the fourth embodiment, a second bent section 326d of the reflection sheet 326 that covers the top surface 340a of the corresponding positioning pin 340 is sandwiched between the top surface of the positioning pin and a frame 14 as illustrated in FIG. 10. A part of the reed portion of the reflection sheet 326 projecting from the first bent point 326a is fixed.

In the backlight unit 324 according to the fourth embodiment, a part of each reed portion at the distal end of the second bent section 326b on the side plate 332b or 332c side is bent at the third bending point 326e and provided as a third bent section 326f. The third bent section 326f is provided by bending the portion of the reflection sheet 326 toward the bottom plate 322a of the backlight chassis 322. The third bent section 326f covers the side surface of the positioning pin 340 facing the side plate 322b or 322c of the backlight chassis 322. Because larger areas of the positioning pins 340 are covered by the third bent sections 326f, rays of light reaching the positioning pins 340 are effectively reflected by the reflection sheet 326.

Fifth Embodiment

Figure 12:
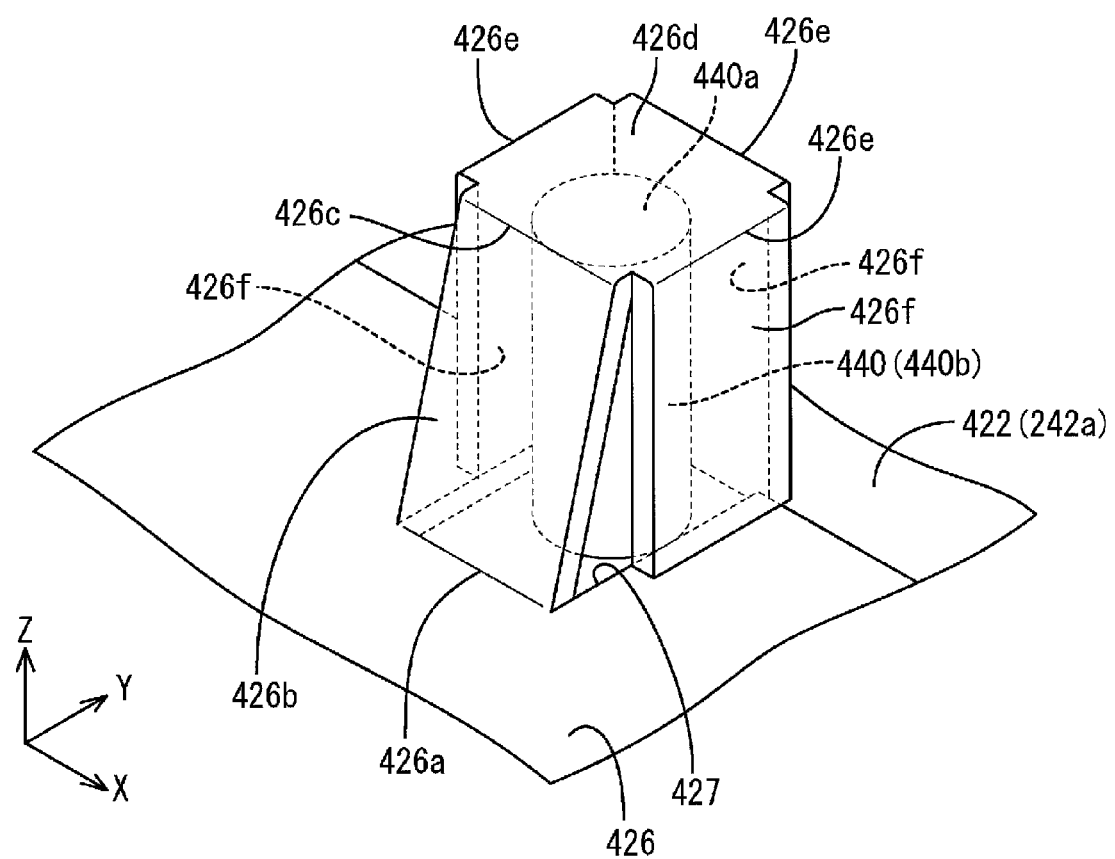
FIG. 12 is a magnified perspective view illustrating a positioning pin 440 and a part of a reflection sheet 426 viewed at an angle from above.

A fifth embodiment will be explained with reference to the drawings. FIG. 12 is a magnified perspective view illustrating a positioning pin 440 and a portion of a reflection sheet 426 according to the fifth embodiment and viewed at an angle from above. In the fifth embodiment, the shape of the reflection sheet 326 that covers the positioning pins 440 is different from that of the first embodiment. Other configurations are the same as those of the first embodiment. The same structures, operations, and effects as those of the first embodiment will not be explained. In FIG. 12, components indicated by symbols with 400 added to those in FIG. 5 have the same configurations as those indicated by the symbols without 400 in the first embodiment.

In the backlight unit according to the fifth embodiment, the reed shaped parts are bent frontward at the respective third bending point 426e and provided as three third bent sections 426f. The three third bent sections 426f cover parts of the side surface 440b of the positioning pin 440 other than apart of the side surface 440b of the positioning pin 440 exposed on a side opposite to the side plate 422b or 422c of the backlight chassis 442. With this configuration, about entire surfaces of the side surfaces 440b of the positioning pins 440 are covered by the reflection sheet 426. Therefore, rays of light reaching the positioning pins 440 are effectively reflected by the reflection sheet 426.

Sixth Embodiment

Figure 13:
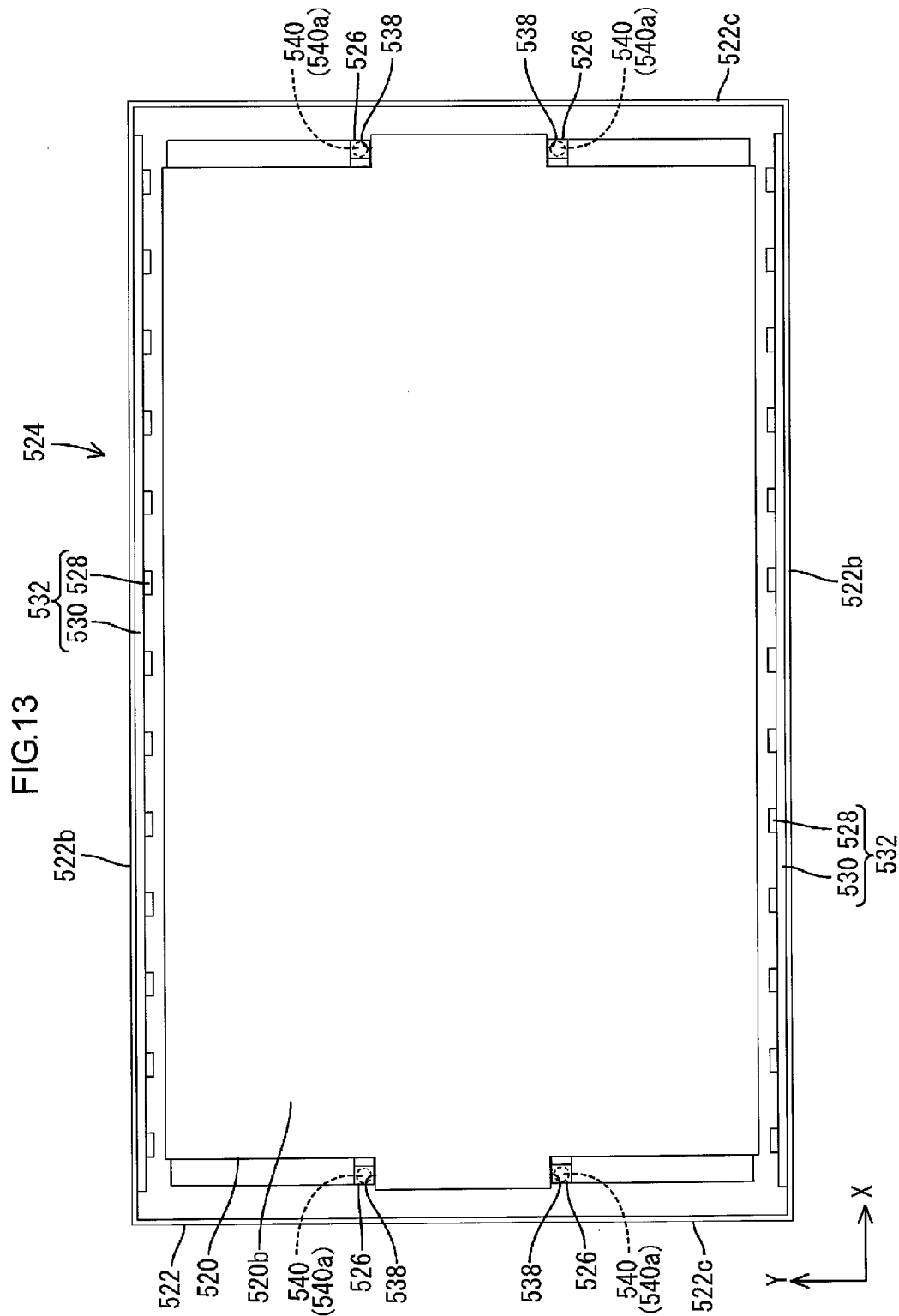
FIG. 13 is a plan view of a backlight unit 524 viewed from the front according to a sixth embodiment.

A sixth embodiment will be explained with reference to the drawings. FIG. 13 is a plan view of a backlight unit 524 viewed from the front according to the sixth embodiment. The sixth embodiment includes a light guide plate having a different shape of side edges of that of the first embodiment. Furthermore, how positioning pins are fitted in cutouts is different from the first embodiment. Other configurations are the same as those of the first embodiment. The same structures, operations, and effects as those of the first embodiment will not be explained. In FIG. 13, components indicated by symbols with 500 added to those in FIG. 3 have the same configurations as those indicated by the symbols without 500 in the first embodiment.

In the backlight unit 524 according to the sixth embodiment, a light guide plate 520 includes projections at shot edges among all edges. In other words, two cutouts 538 are provided at each shot side edge and thus a remaining portion in which the cutouts 538 are not provided is a projection. Four cutouts 538 are provided in the light guide plate 520. The positioning pins 540 project from the bottom plate 522a of the backlight chassis 522 so as to sandwich and hold the projection at each short side from sides. With this configuration, the light guide plate 520 is positioned with respective to the surface direction. Even if the light guide plate 520 has such a shape, the parts of the positioning pins 540 are covered by the bent parts of the reflection sheet 526. Therefore, at least some rays of light reaching the positioning pins 540 can be reflected by the reflection sheet 526.

Seventh Embodiment

Figure 14:
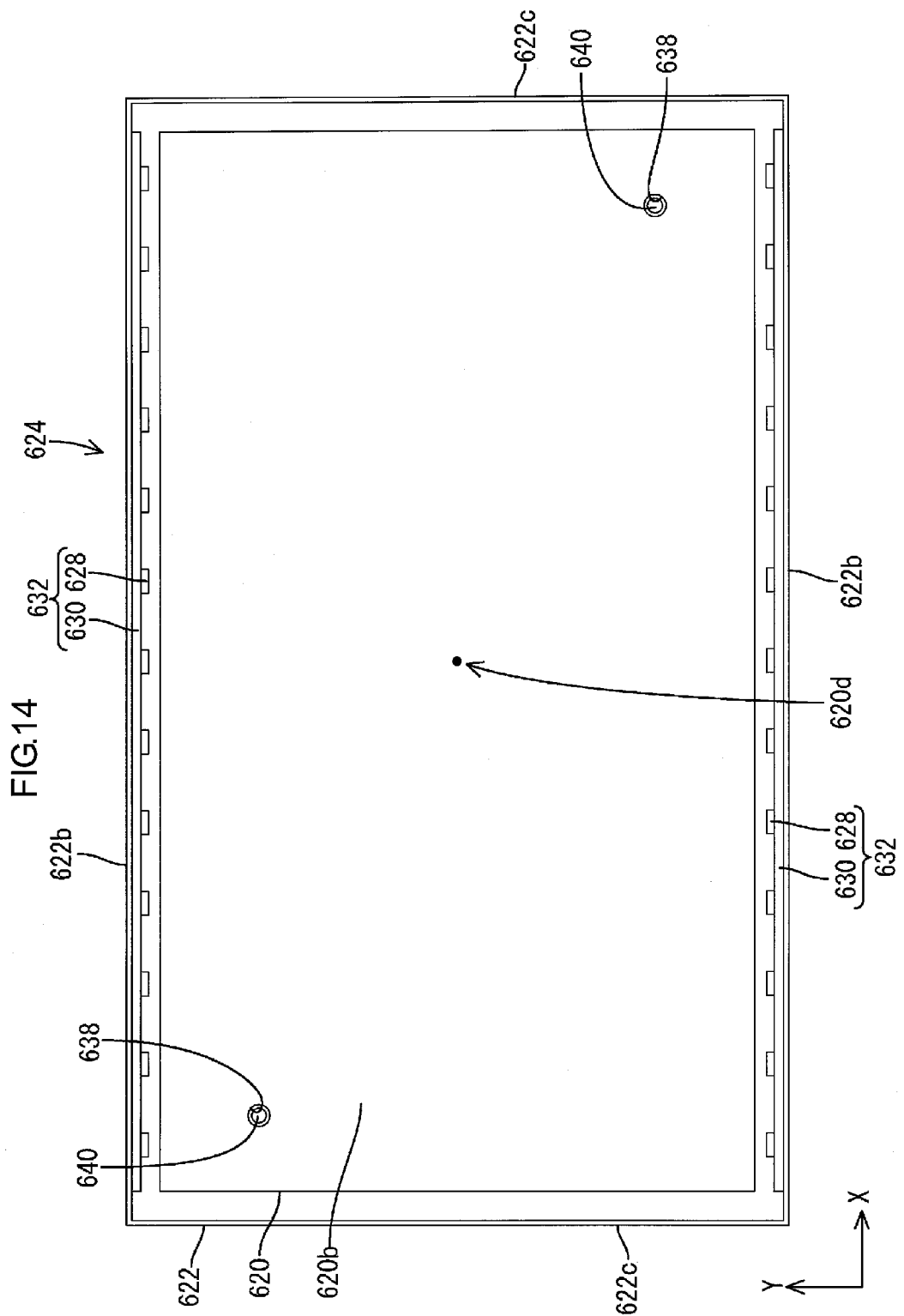
FIG. 14 is a plan view of a backlight unit 624 viewed from the front according to a seventh embodiment.
Figure 15:
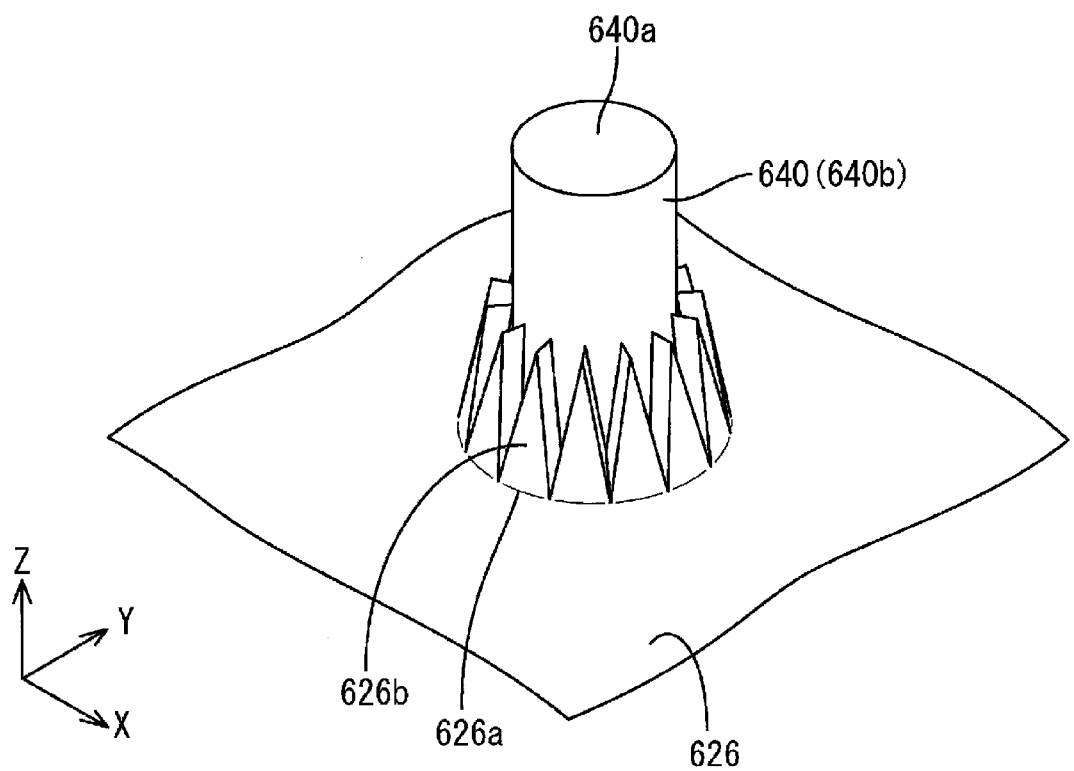
FIG. 15 is a magnified perspective view illustrating a positioning pin 640 and a part of a reflection sheet 626 viewed at an angle from above.

A seventh embodiment will be explained with reference to the drawings. FIG. 14 is a plan view of a backlight unit 624 viewed from the front according to a seventh embodiment. FIG. 15 is a magnified perspective view illustrating a positioning pin 640 and a portion of a reflection sheet 626 viewed at an angle from above. The seventh embodiment includes alight guide plate having cutouts in different shape and arrangement from those in the first embodiment. Furthermore, the seventh embodiment includes a reflection sheet including parts that cover positioning pins in different shape from those in the first embodiment. Other configurations are the same as those of the first embodiment. The same structures, operations, and effects as those of the first embodiment will not be explained. In FIGS. 14 and 15, components indicated by symbols with 600 added to those in FIGS. 3 and 5 have the same configurations as those indicated by the symbols without 600 in the first embodiment.

In the backlight unit 624 according to the seventh embodiment, cutouts 638 in a light guide plate 620 are through holes. The light guide plate 620 has two cutouts 638 arranged symmetrically about the center of the light guide plate 620. The positioning pins 640 may be arranged according to the shape and the arrangement of the light guide plate 620.

In the backlight unit 624 according to the seventh embodiment, a plurality of first bending points exit all around the outer periphery of each positioning pin 840. A plurality of first bent sections 626b having a tapered shape rise from the first bending points 626a toward the front of the light guide plate 620. A lower part of the side surface of each positioning pin 640 is covered by the reflection sheet 626 for all around the outer periphery.

Eighth Embodiment

Figure 16:
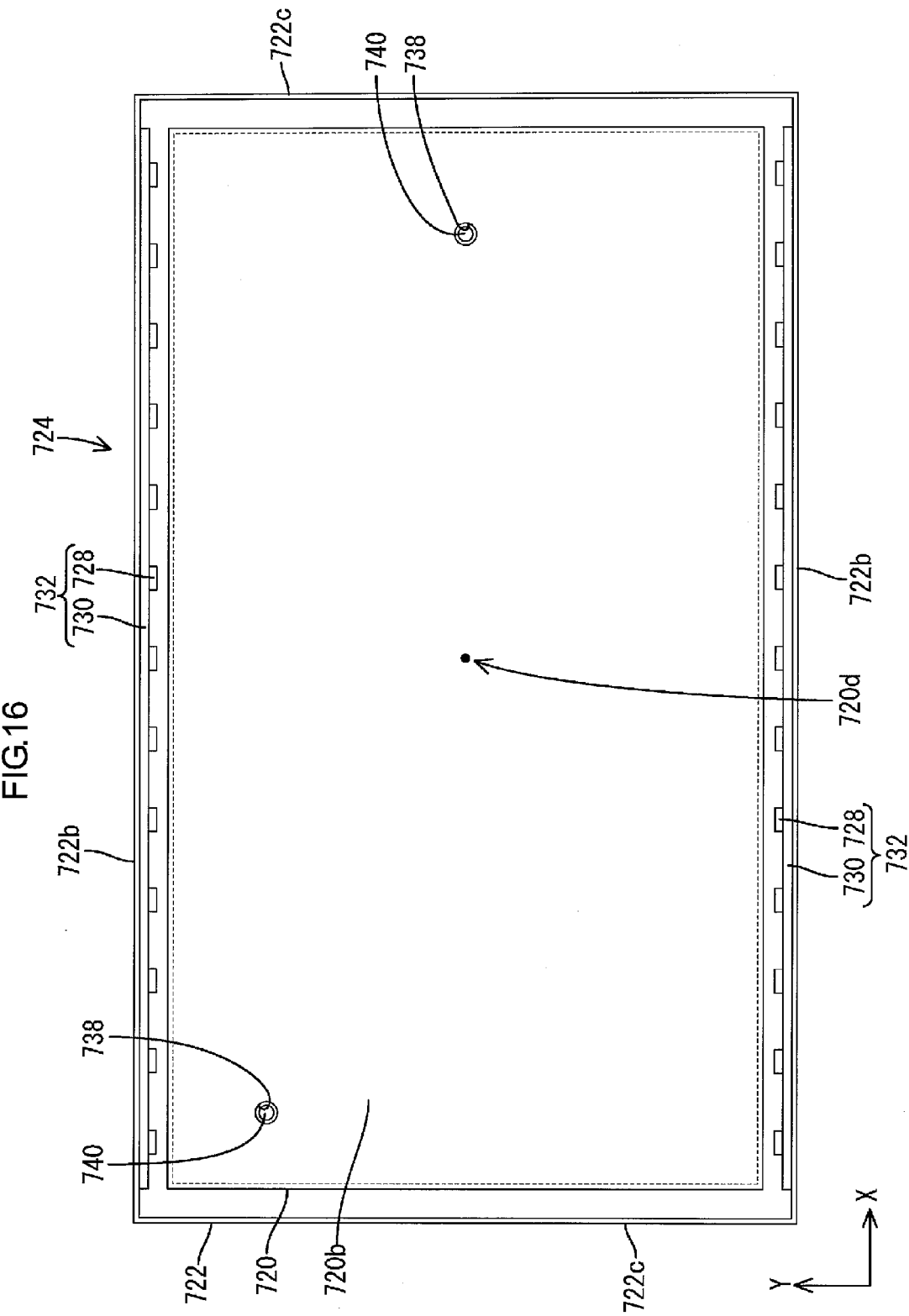
FIG. 16 is a plan view of a backlight unit 724 viewed from the front according to an eighth embodiment.

An eighth embodiment will be explained with reference to the drawings. FIG. 16 is a plan view of a backlight unit 724 viewed from the front according to an eighth embodiment. The seventh embodiment includes a light guide plate having cutouts in different arrangement from those in the seventh embodiment. Other configurations are the same as those of the first embodiment. The same structures, operations, and effects as those of the seventh embodiment will not be explained. In FIG. 16, components indicated by symbols with 700 added to those in FIG. 3 have the same configurations as those indicated by the symbols without 700 in the first embodiment.

In the backlight unit 724 according to the eighth embodiment, two cutouts 738, which are through holes, are provided in a light guide plate 720. The cutouts 738 are arranged asymmetrically about the center of the light guide plate 720. The positioning pins 740 may be arranged according to the shape and the arrangement of the light guide plate 720.

Relationships between components in the embodiments and claimed elements will be described. The LED(s) 28, 128 may be considered as an example of a light source. The backlight chassis 22, 122 may be considered as an example of a housing. The backlight unit 24, 124 may be considered as an example of a lighting device. The positioning pin(s) 40, 140, 240 may be considered as an example of a positioning member.

Modifications of the above embodiments will be listed below.

(1) In the above embodiment, the LEDs, which are planar light sources, are used as light sources. However, linear light sources such as discharge tubes may be used as light sources.

(2) In the above embodiments, the positioning pins project from the bottom plate of the backlight chassis. However, the arrangement of the positioning pins is not limited to the above. For example, positioning members (e.g., protrusions) may project from the side plates of the backlight chassis.

(3) In the above embodiments, the parts of the reflection sheet in locations where the positioning pins are arranged are bent prior to the placement thereof on the bottom surface of the backlight chassis. However, the configuration of the reflection sheet is not limited to the above. For example, the parts of the reflection sheet may not be bent at first and the first bending points may be only provided. In this case, the parts of the reflection sheet may be pushed by the positioning pins when the reflection sheet is placed on the bottom plate of the backlight chassis. As a result, the parts of the reflection sheet may be bent frontward at the first bending points.

(4) The shape, the number, and the arrangements of the cutouts may be altered from those in the above embodiments as appropriate.

(5) The shape, the number, and the arrangements of the positioning pins may be altered from those in the above embodiments as appropriate.

(6) How the parts of the reflection sheet are bent and how the reflection sheet covers the parts of the positioning pins may be altered from the above embodiments as appropriate.

(7) In the above embodiments, the liquid crystal display device including the liquid crystal panel as the display panel is used. However, the aspect of the present invention can be applied to display devices including other types of display panels.

(8) In the above embodiments, the television device including the tuner is used. However, the aspect of the present invention can be applied to display devices without tuners.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in original claims. With the technologies described in this specification and the drawings, multiple objects may be accomplished at the same time. However, the technical benefits can be achieved by accomplishing even only one of the objects.

EXPLANATION OF SYMBOLS

TV: Television device, Ca, Cb: Cabinet, T: Tuner, S: Stand, 10, 110: Liquid crystal display device, 12: Bezel, 14: Frame, 16, 116: Liquid crystal panel, 18, 118: Optical member, 18*a*: Diffuser sheet, 18*b*: Lens sheet, 18*c*: Reflection-type polarizing plate, 20, 120, 220: Light guide plate, 20*a*: Light entrance surface, 20*b*: Light exit surface, 20*c*: Opposite surface, 22, 122: Backlight chassis, 22*a*: Bottom plate, 22*b*, 22*c*: Side plate, 24, 124: Backlight unit, 26, 126, 226, 326, 426, 526, 626, 726: Reflection sheet, 27, 127, 227: Reflection sheet cutout, 28, 128: LED, 30, 130: LED board, 32, 132: LED unit, 38: Fitting recess, 40, 140, 240, 340, 440, 540, 640, 740: Positioning pin, 40*a*, 40*b*, 40*c*: Top surface, 40*b*, 140*b*, 240*b*: Side surface.

The invention claimed is:

1. A lighting device comprising:
a light guide plate having a light entrance surface, a light exit surface, an opposite surface, and a cutout, the light entrance surface being a side surface of the light guide plate, the light exit surface being one of plate surfaces of the light guide plate, the opposite surface being an opposite surface from the light exit surface;

a light source arranged opposite the light entrance surface of the light guide plate;

a reflection sheet arranged adjacent to the opposite surface of the light guide plate;

a housing having a bottom plate and a side plate rising from an outer edge of the bottom plate on one of surfaces of the bottom plate, the housing holding at least the reflection sheet and the light guide plate arranged on the one of surfaces of the bottom plate; and a positioning member provided on the housing and fitted in the cutout such that the light guide plate is positioned with respect to a planar direction thereof, wherein the positioning member is fitted in the cutout, and the reflection sheet has a bent portion in a location where the cutout is located, and covers at least a part of the positioning member exposed on an opposite side to the side plate.

2. The lighting device according to claims 1, wherein the reflection sheet includes a first bent portion provided by bending a part of the reflection sheet toward the light exit surface of the light guide plate in the location where the cutout is located.

3. The lighting device according to claim 1, wherein the first bent portion is provided by bending the portion of the reflection sheet along an edge of the cutout.

4. The lighting device according to claim 2, wherein the first bent portion includes a plurality of first bent portions in the location where the cutout is located.

5. The lighting device according to claim 2, wherein the reflection sheet further includes a second bent portion provided by bending a portion of the reflection sheet at a distal end of the first bent portion toward the side plate of the housing.

6. The lighting device according to claim 5, wherein the reflection sheet further includes a third bent portion provided by bending a portion of the reflection sheet at a distal end of the second bent portion toward the bottom plate of the housing.

7. The lighting device according to claim 1, wherein the positioning member projects from the bottom plate of the housing.

8. The lighting device according to claim 7, wherein the positioning member has a columnar shape.

9. The lighting device according to claim 8, wherein the reflection sheet covers a top surface of the positioning member.

10. The lighting device according to claim 9, wherein the reflection sheet covers a side surface of the positioning member.

11. The lighting device according to claim 9, further comprising an optical member, wherein
a portion of the reflection sheet covering the top surface of the positioning member is sandwiched between the top surface and the optical member.

12. The lighting device according to claim 9, further comprising a frame arranged adjacent to the light exit surface of the light guide plate, wherein
a portion of the reflection sheet covering the top surface of the positioning member is sandwiched between the top surface and the optical member.

13. The lighting device according to claim 1, wherein the cutout is in a shape that tapers as a distance from the side plate of the housing increases.

14. The lighting device according to claim 1, wherein the positioning member is provided integrally with the bottom plate of the housing.

15. The lighting device according to claim 1, wherein the positioning member includes a plurality of positioning members arranged symmetrically about a center of the light guide plate.

16. The lighting device according to claim 1, wherein the positioning member includes a plurality of positioning members arrange asymmetrically about a center of he light guide plate.

17. A display device comprising a display panel configured to provide display using light from the lighting device according to claim 1.

18. The display device according to claim 17, wherein the display panel is a liquid crystal display panel including liquid crystals.

19. A television device comprising the display device according to claim 17.

* * * * *